(12) United States Patent
Mai

(10) Patent No.: US 11,116,346 B2
(45) Date of Patent: Sep. 14, 2021

(54) EMULATIONAL CHRISTMAS TREE BRANCH AND MANUFACTURING PROCESS THEREFOR

(71) Applicant: Shenzhen City Ming Jie Hao Technology Co., Ltd., Shenzhen (CN)

(72) Inventor: Junjie Mai, Shenzhen (CN)

(73) Assignee: SHENZHEN CITY MING JIE HAO TECHNOLOGY CO., LTD.

( * ) Notice: Subject to any disclaimer, the term of this patent is extended or adjusted under 35 U.S.C. 154(b) by 65 days.

(21) Appl. No.: 16/349,906

(22) PCT Filed: Jan. 24, 2017

(86) PCT No.: PCT/CN2017/072529
§ 371 (c)(1),
(2) Date: May 14, 2019

(87) PCT Pub. No.: WO2018/086261
PCT Pub. Date: May 17, 2018

(65) Prior Publication Data
US 2020/0060461 A1    Feb. 27, 2020

(30) Foreign Application Priority Data

Nov. 14, 2016    (CN) .......................... 201610997680.8

(51) Int. Cl.
*A47G 33/06*    (2006.01)
*B29C 45/14*    (2006.01)
*B29L 31/00*    (2006.01)

(52) U.S. Cl.
CPC ........ *A47G 33/06* (2013.01); *B29C 45/14336* (2013.01); *B29C 45/14* (2013.01); *B29L 2031/7026* (2013.01)

(58) Field of Classification Search
CPC ........ B29C 45/14336; B29C 45/14385; B29C 45/14409; B29C 2045/0032;
(Continued)

(56) References Cited

U.S. PATENT DOCUMENTS 2,826,845 A     3/1955  Warren
2,976,632 A    10/1959  Nicholas
(Continued)

FOREIGN PATENT DOCUMENTS

CN       2075045 U     4/1991
CN    101088437 A    12/2007
(Continued)

OTHER PUBLICATIONS

International Search Report and Written Opinion of the International Searching Authority dated Jul. 18, 2017, for corresponding PCT/CN2017/072529, 7 pages.
(Continued)

*Primary Examiner* — Stella K Yi
(74) *Attorney, Agent, or Firm* — Cozen O'Connor

(57) ABSTRACT

An artificial tree branch includes a tree branch body formed by injection molding a first material over an internal structural member of a second material. The tree branch body includes a main body portion having an elongated shape with a first end and a second end, and a plurality of sockets formed at various positions along the main body. Each socket is formed as an outward bulge from the main body portion, with the outward bulge defining a cavity to receive and retain artificial tree leaves.

4 Claims, 1 Drawing Sheet

(58) Field of Classification Search
CPC ........ B29C 2045/0049; B29C 45/0062; B29C 45/13; B29C 2045/135; B29C 45/14
See application file for complete search history.

(56) References Cited

U.S. PATENT DOCUMENTS

| | | |
|---|---|---|
| 3,594,260 A | 1/1970 | Dieffenbach |
| 5,077,646 A | 12/1991 | Parsons |
| 5,409,745 A | 4/1995 | McGuire |
| 5,455,750 A | 10/1995 | Davis et al. |
| 5,855,705 A | 1/1999 | Gauthier |
| 6,037,021 A | 3/2000 | Koo |
| 6,117,503 A | 9/2000 | Lee et al. |
| 6,180,194 B1 | 1/2001 | Liang |
| 6,257,793 B1 | 7/2001 | Lin |
| 6,320,327 B1 | 11/2001 | Lavatelli et al. |
| 6,431,740 B1 | 8/2002 | Puleo |
| 6,907,168 B2 | 6/2005 | Tang |
| 7,232,596 B2 | 6/2007 | Lai |
| 8,298,633 B1 | 10/2012 | Chen |
| 8,932,689 B2 | 1/2015 | Wei |
| 9,439,528 B2 | 9/2016 | Chen |
| 9,484,687 B1 | 11/2016 | Chen |
| 2004/0096596 A1 | 5/2004 | Palmer, III et al. |
| 2004/0191431 A1 | 9/2004 | Lai |
| 2007/0230174 A1 | 10/2007 | Hicks et al. |
| 2010/0003891 A1 | 1/2010 | Chen |
| 2010/0323129 A1 | 12/2010 | Tsai |
| 2018/0132645 A1 | 5/2018 | Mak |
| 2018/0206663 A1 | 7/2018 | George |

FOREIGN PATENT DOCUMENTS

| | | | |
|---|---|---|---|
| CN | 201759314 U | 3/2011 | |
| CN | 205585807 U | 9/2016 | |
| WO | WO-2010057426 A1 * | 5/2010 | ............. A41G 1/005 |

OTHER PUBLICATIONS

Advantages of Adhesives Over Mechanical Assembly, MasterBond, Jan. 8, 2015, https://www.masterbond.com/techtips/advantages-adhesives-over-mechanical-assembly.
File History of U.S. Appl. No. 15/660,464.

* cited by examiner

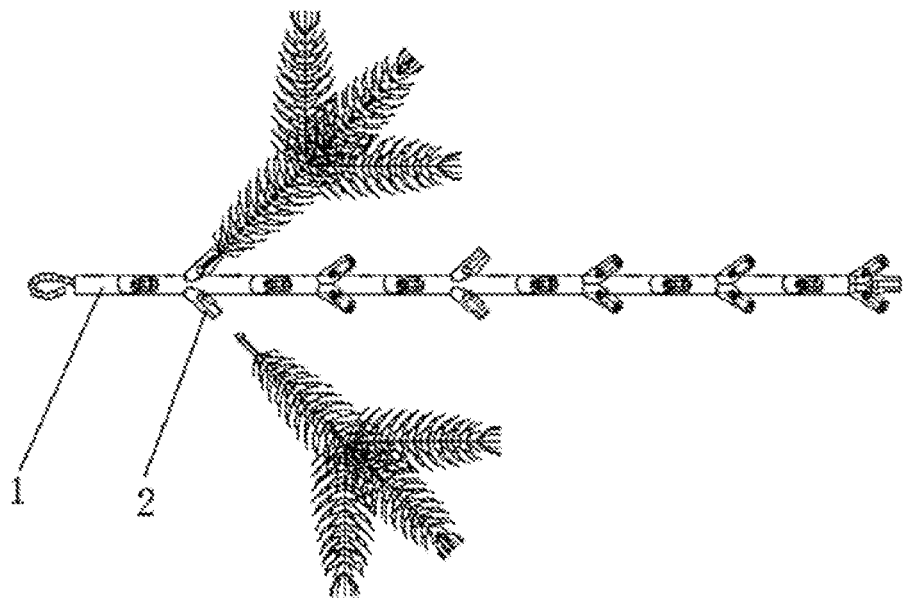

EMULATIONAL CHRISTMAS TREE BRANCH AND MANUFACTURING PROCESS THEREFOR

TECHNICAL FIELD

The present invention relates to the technical field of artificial Christmas tree branch processing, in particular to an artificial Christmas tree branch and a process for manufacturing same.

BACKGROUND

As people's living standards improve, people pursue a higher quality of life. Certain artificial Christmas trees are also serving a decorative function to an ever increasing extent. However, some decorative Christmas trees are often not very lifelike, and are produced by binding in manually operated machinery. Christmas trees made in this way have an excessively high cost and deform easily, and layers easily fall off. During production, a large amount of manual labour is required to spread out each leaf in each layer. Moreover, after buying the Christmas tree and taking it home, the customer also has to spread out each leaf in each layer. The gaps are not uniform, and every Christmas tree produced is different. These are all problems in need of a solution.

SUMMARY

Aspects of the embodiments disclosed herein to an artificial Christmas tree branch and a process for manufacturing same.

Some embodiments employ the following technical solution:

An artificial Christmas tree branch, comprising an artificial Christmas tree branch body, characterized in that a socket is provided on the artificial Christmas tree branch body, and a hook for assembling a Christmas tree is provided at one end of the artificial Christmas tree branch body; tree bark texture is uniformly distributed, or tree bark texture is half-distributed, or no tree bark texture is provided, on the artificial Christmas tree branch body.

Aspects of some embodiments disclosed herein also include a process for manufacturing an artificial Christmas tree branch, comprising the following steps:

S1: manufacturing a mould for injection moulding:

1). using 3D software to draw a mould drawing, making an artificial model from a conceptualized mould style using 3D software, at the same time performing graphic modification according to an actual branch style to be attained, until a required result is reached;

2). numerical control processing centre processing; based on a mould model drawn by 3D software, automatic programming design can be performed using 3D software; programming data is imported into the numerical control processing centre, and numerical control processing of the mould can be performed; during processing, attention must be paid to the brightness and cleanliness of a mould surface, so that subsequent injection moulding is more convenient and quick, and demoulding is more simple and convenient;

3). trimming of mould interior; there is a great deal of tree bark texture on the artificial Christmas tree branch; when injection moulding is performed in the mould, carving design of this tree bark texture must be performed artificially by hand; at the same time, attention must be paid during carving to the trimming of iron dust and rough edges, to remove the iron dust and rough edges, and prevent product quality from being affected;

S2: addition of steel wire: a steel wire is arranged in the mould before injection moulding; the steel wire is arranged uniformly, such that the steel wire has a supporting and reinforcing action in the injection-moulded branch;

S3: injection moulding: a starting material is softened with the cooperation of an injection moulding machine; the starting material may be injected into the mould by means of the injection moulding machine, in order to injection-mould the artificial Christmas tree branch;

S4: manufacture of socket on branch body: the manufacture of the socket generally requires a push pin to be added and put into a socket position during injection moulding, so that when injection moulding is performed, the push pin will cause the socket to be reserved at the socket position, and the manufacture of the artificial Christmas tree branch body is thereby completed;

S5: cooling and demoulding: cooling is performed to reduce the temperature, and the moulded artificial Christmas tree branch is taken out, in order to be used subsequently; water-cooling is used for auxiliary temperature reduction during cooling and demoulding.

Compared with the prior art, the artificial Christmas tree branch has the following beneficial effects: The present invention lowers costs, simplifies technology, saves energy, facilitates assembly, refines technology, has high precision, is more three-dimensional, feels more real, is safer, increases production efficiency, is more user-friendly, is easy to disassemble, can be used in cooperation with all kinds of tree leaves, and is diversified. The degree of lifelikeness is high, the assembly process does not require any machinery, distance and shape can be controlled accurately, ensuring the same distance for each set of branches and very accurate shape, binding technology is developed into socket technology, safety is improved, and production efficiency is increased; the artificial Christmas tree branch can be matched up freely with different tree leaves, is more diversified, is more user-friendly, is specifically used to manufacture various types of decorative articles such as Christmas trees, Christmas rattan and Christmas wreaths; a tree made from the artificial Christmas tree branch does not need to be spread out, so the hassle of a customer having to spread out the tree himself after buying it and taking it home is avoided—after being bought and taken home by the customer, it will have the shape of a Christmas tree; at the same time, the addition of the steel wire in the branch body can greatly increase the strength of the branch body.

BRIEF DESCRIPTION OF THE DRAWING

FIG. 1 is a three-dimensional structural schematic diagram of the present invention.

In the FIGURE: 1—artificial Christmas tree branch body, 2—socket.

DETAILED DESCRIPTION OF PREFERRED EMBODIMENTS

In order to clarify the object, technical solution and advantages of the present invention, the present invention is explained in further detail below with reference to a particular embodiment. It should be understood that the particular embodiment described here is merely intended to explain the present invention, not to limit it.

Embodiment 1

An artificial Christmas tree branch, comprising an artificial Christmas tree branch body 1, characterized in that sockets 2 are provided on the artificial Christmas tree branch body 1, and a hook for assembling a Christmas tree is provided at one end of the artificial Christmas tree branch body 1; tree bark texture is uniformly distributed, or tree bark texture is half-distributed, or no tree bark texture is provided, on the artificial Christmas tree branch body 1.

The present invention also provides a process for manufacturing an artificial Christmas tree branch, comprising the following steps:

S1: manufacturing a mould for injection moulding:

1). using 3D software to draw a mould drawing, making an artificial model from a conceptualized mould style using 3D software, at the same time performing graphic modification according to an actual branch style to be attained, until a required result is reached;

2). numerical control processing centre processing; based on a mould model drawn by 3D software, automatic programming design can be performed using 3D software; programming data is imported into the numerical control processing centre, and numerical control processing of the mould can be performed; during processing, attention must be paid to the brightness and cleanliness of a mould surface, so that subsequent injection moulding is more convenient and quick, and demoulding is more simple and convenient;

3). trimming of mould interior; there is a great deal of tree bark texture on the artificial Christmas tree branch; when injection moulding is performed in the mould, carving design of this tree bark texture must be performed artificially by hand; at the same time, attention must be paid during carving to the trimming of iron dust and rough edges, to remove the iron dust and rough edges, and prevent product quality from being affected;

S2: addition of steel wire: a steel wire is arranged in the mould before injection moulding; the steel wire is arranged uniformly, such that the steel wire has a supporting and reinforcing action in the injection-moulded branch;

S3: injection moulding: a starting material is softened with the cooperation of an injection moulding machine; the starting material may be injected into the mould by means of the injection moulding machine, in order to injection-mould the artificial Christmas tree branch;

S4: manufacture of sockets on branch body: the manufacture of the sockets generally requires push pins to be added and put into socket positions during injection moulding, so that when injection moulding is performed, the push pins will cause the sockets to be reserved at the socket positions, and the manufacture of the artificial Christmas tree branch body is thereby completed;

S5: cooling and demoulding: cooling is performed to reduce the temperature, and the moulded artificial Christmas tree branch is taken out, in order to be used subsequently; water-cooling is used for auxiliary temperature reduction during cooling and demoulding.

The present invention lowers costs, simplifies technology, saves energy, facilitates assembly, refines technology, has high precision, is more three-dimensional, feels more real, is safer, increases production efficiency, is more user-friendly, is easy to disassemble, can be used in cooperation with all kinds of tree leaves, and is diversified. The degree of lifelikeness is high, the assembly process does not require any machinery, distance and shape can be controlled accurately, ensuring the same distance for each set of branches and very accurate shape, binding technology is developed into socket technology, safety is improved, and production efficiency is increased; the artificial Christmas tree branch can be matched up freely with different tree leaves, is more diversified, is more user-friendly, is specifically used to manufacture various types of handicrafts such as artificial Christmas trees, artificial Christmas rattan and artificial Christmas wreaths; a tree made from the artificial Christmas tree branch does not need to be spread out, so the hassle of a customer having to spread out the tree himself after buying it and taking it home is avoided—after being bought and taken home by the customer, it will have the shape of a Christmas tree; at the same time, the addition of the steel wire in the branch body can greatly increase the strength of the branch body.

The above embodiment is merely a preferred particular embodiment of the present invention, but the scope of protection of the present invention is not limited to this. All equivalent substitutions or changes made by any person skilled in the art within the technical scope disclosed in the present invention on the basis of the technical solution of the present invention and the inventive concept thereof should be included in the scope of protection of the present invention.

The invention claimed is:

1. A method for manufacturing an artificial tree branch, the method comprising:
   providing an injection-molding machine including a mold having an interior surface corresponding to an exterior surface of the artificial tree branch;
   placing a plurality of pins at various positions in the interior of the mold;
   softening a moldable first material;
   arranging a structural member of a second material in an interior of the mold, wherein the structural member includes a protruding portion that protrudes from the first end of the tree branch body, the protruding portion including a hook fastener;
   after arranging the structural member, injecting the softened first material into the mold to cover at least a portion of the structural member to form a main body portion having an elongated shape with a first end and a second end, and a plurality of sockets at various positions along the main body corresponding to the various positions of the plurality of pins, each socket being formed as an outward bulge from the main body portion with a cavity reserved by a corresponding one of the plurality of pins;
   after the injecting, reducing a temperature of the first material in the interior of the mold and removing the formed main body portion; and
   removing any remaining pins from the plurality of sockets.

2. The method of claim 1, wherein the internal structural member comprises a wire.

3. The method of claim 1, wherein at least a portion of the interior of the mold includes a tree-bark texture to produce a tree-bark texture on at least a portion of an exterior of the main body portion.

4. The method of claim 1, wherein the elongated shape of the main body portion is generally straight.

* * * * *